United States Patent [19]

Ghosh et al.

[11] Patent Number: 5,881,363
[45] Date of Patent: Mar. 9, 1999

[54] METHOD AND APPARATUS FOR COMBATTING INGRESS AND MULTIPATH IN A CATV RETURN CHANNEL

[75] Inventors: Monisha Ghosh, Mohegan Lake, N.Y.; Samir N. Hulyalkar, Columbia, Md.

[73] Assignee: Philips Electronics North America, New York, N.Y.

[21] Appl. No.: 641,152

[22] Filed: Apr. 29, 1996

[51] Int. Cl.[6] .................................................. H04N 7/10
[52] U.S. Cl. ................................. 455/5.1; 348/12
[58] Field of Search ................................ 348/5.5, 6, 8, 7, 348/9, 10, 11, 12, 13, 18, 15, 16, 17, 21, 192, 193, 607, 608, 618, 622, 624; 455/3.1, 3.2, 3.3, 4.1, 4.2, 5.1, 6.1, 6.2; 326/107, 123; 340/310.3; H04N 7/10

[56] References Cited

U.S. PATENT DOCUMENTS 3,750,022  7/1973  Curry et al. ..................... 455/429 X
5,126,840  6/1992  Dufresne et al. ................. 455/4.1 X

OTHER PUBLICATIONS

Eldering et al., "Engineering Requirements for Hybrid Fiber–Coax Telephony Systems", 1994 National Cable Television Association Show, May 1994.

*Primary Examiner*—Nathan J. Flynn
*Attorney, Agent, or Firm*—Robert McDermott

[57] ABSTRACT

In a CATV return channel between a transmitter and a headend receiver, the transmitter is provided with a precoder having programmable but fixed coefficients. The receiver is provided with an ingress rejection filter (IRF) having programmable but fixed coefficients. A non-precoded training sequence is sent from the transmitter to the receiver during a training interval. A multipath and an ingress in the CATV return channel are estimated at the receiver based upon the training sequence sent by the transmitter and received by the receiver. The precoder coefficients and the IRF coefficients are calculated and the precoder and the ingress rejection filter are programmed with the calculated coefficients, respectively. The precoder and the ingress rejection filter use the respective calculated coefficients during a data transmission interval to simultaneously compensate for undesirable effects of multipath and ingress noise in the CATV return channel during data transmission from the transmitter to the headend.

13 Claims, 10 Drawing Sheets

METHOD AND APPARATUS FOR COMBATTING INGRESS AND MULTIPATH IN A CATV RETURN CHANNEL

BACKGROUND OF THE INVENTION

1. Field of the Invention

This invention generally relates to a method and apparatus for combatting ingress and multipath in a digital CATV return channel, and more particularly, to the use of a precoder in the transmitter of user equipment and an ingress rejection filter in the receiver of headend equipment.

2. Discussion of the Related Art

The Cable Television (CATV) return channel (alternatively referred to as the upstream cable channel) has become the focus of significant attention recently as is evidenced by IEEE 802.14 standardization activity. Typically, CATV was designed to provide a broadband access from a headend to a consumer in a tree network, i.e., a group of homes would be serviced by one node, which in turn gets serviced along with another set of such nodes, and so on, until the terminal node is the headend. A provision for a "return" transmission from the consumer to the headend was also provided. However, a lack of services on the CATV return channel has resulted in the design of a CATV network such that the CATV return channel is not as "clean" as the CATV forward channel. At this time, digital data promises to provide two-way services, for example, cable telephony, internet access, video conferencing, etc.. As a result of existing CATV networks and the corresponding CATV return channels, two-way digital data services are undesirably degraded and less than optimal.

The CATV return channel is characterized by the frequency band between 5–50 MHz. The CATV return channel is plagued by ingress noise resulting due to a poor shielding of cable used at different cable locations. In addition to ingress noise, multipath caused by microreflections can also deteriorate the quality of the channel for digital data transmission. As a result, the reliability of digital data transmitted over the CATV return channel is compromised and not ensured.

Currently, physical layer proposals submitted to the IEEE 802.14 deal with the problem of ingress noise by avoidance in several different ways. In a Frequency Agile Multi-Modem (FAMM) proposal, the method involves finding regions in the spectrum which do not have appreciable ingress noise and transmitting in those regions only. In multicarrier proposals Discrete Wavelet Multi-tone (DWMT) and Discrete Multi-tone (DMT), the method does not use carriers that are corrupted by ingress noise for data transmission. In a Code Division Multiple Access (CDMA) proposal, the method uses as spreading vectors only those eigenvectors of the ingress noise that have low variance. In each of the mentioned proposals, the methods disadvantageously sacrifice bandwidth in order to avoid ingress noise. In other words, the presence of ingress noise limits an available bandwidth for transmission since the proposed methods seek to avoid regions in the spectrum where the ingress noise is dominant.

Typical scenarios of digital data transmission over the CATV return channel may involve a combination of Frequency Division Multiple Access (FDMA) and Time-Division-Multiple Access (TDMA) schemes, as was observed in most of the Media Access (MAC) layer protocols proposed in the November 1995 meeting of IEEE 802.14, held in Montreal, Canada. FDMA is just a fancy name for subdividing the entire frequency band between 5–50 MHz into smaller equal-sized bands, typically of 6 MHz bandwidth. Within each 6 MHz band, TDMA is used, i.e., users that need to transmit data are assigned time slots within a TDMA frame. These time slots can be fixed for every user, which can be quite wasteful depending on the traffic model assumed for each user. Another strategy that can also be used is a reservation based policy in which the time slots are dynamically assigned to each user. Depending on which strategy is chosen, it can be assumed in general that transmission of data from slot to slot may or may not be from the same user (i.e., from the same TDMA transmitter). Thus, it can be seen that for the CATV return channel, a TDMA transmitter will transmit only in short bursts of time.

In order to assure reliability and maintain high integrity, digital TDMA transmission must be robust in the presence of ingress noise and multipath. This situation of digital TDMA transmission over a CATV return channel is complicated by the fact that each return path will have a different multipath characteristic. See for instance FIG. 1, in which a CATV system 10 having a return channel for multiple system users $12_{(1-N)}$ is shown. System users $12_{(1-N)}$ are each connected to headend 14 via a corresponding return channel, wherein each return channel has a different corresponding multipath characteristic (1-N). Fortunately, ingress noise can be assumed generally to have the same frequency domain characteristics during the period of one frame of transmission, since the headend receiver observes the sum of all ingress noise from all TDMA transmitters at any instant. It is, however, possible that the ingress will have somewhat different characteristics when different transmitters are active. This latter situation can occur since ingress is a result of the amount of atmospheric signals absorbed by an unshielded cable, which in turn depends on the voltage characteristics of the signal travelling through the cable.

SUMMARY OF THE INVENTION

An object of the present invention is to overcome the above mentioned obstacles for two-way services and to develop methods which are able to combat the problems faced by digital data transmission over a CATV return channel.

Another object of the present invention is to provide a method that will ensure the reliability of the digital data transmitted over the CATV return channel.

Still another object of the present invention is to provide a method and apparatus for ingress cancellation using a precoding approach at a transmitter combined with filtering at a receiver for improving upstream transmission efficiency without disadvantageously sacrificing bandwidth.

According to the present invention, a method for combatting ingress noise and multipath in a CATV return channel between a terminal unit having a transmitter and a headend having a receiver comprises the steps of: a) providing the transmitter with a precoder having programmable but fixed coefficients; b) providing the receiver with an ingress rejection filter (IRF) having programmable but fixed coefficients; c) sending a non-precoded training sequence from the transmitter to the receiver during a training interval; d) estimating the multipath and the ingress at the receiver based upon the training sequence sent by the transmitter and received by the receiver and calculating the precoder coefficients and the IRF coefficients; and f) programming the precoder and the ingress rejection filter with the calculated precoder coefficients and IRF coefficients, respectively, for use by the precoder and the ingress rejection filter during a data transmission interval, wherein undesirable effects of multipath and ingress noise are simultaneously compensated for in the CATV return channel during data transmission from the transmitter to the headend.

In addition, according to the present invention, a system for combatting ingress noise and multipath in a CATV return channel includes a transmitter means for transmitting digital data along the CATV return channel having a multipath characteristic and ingress noise. The transmitter means includes a precoder for precoding the digital data to be transmitted, wherein the precoder has programmable but fixed coefficients. A headend means is provided for receiving the transmitted digital data of the transmitter means. The headend means includes an ingress rejection filter (IRF) having programmable but fixed coefficients. The headend means further includes an estimator means for estimating during a training interval the multipath and the ingress noise at the headend based upon a non-precoded training sequence sent by the transmitter means and received by the headend means. The estimator means calculates the coefficients for use in the precoder and the ingress rejection filter, respectively, upon a reception of the training sequence. The estimator means further provides output signals for programming the precoder and the ingress rejection filter, respectively, with the calculated coefficients, wherein undesirable effects of multipath and ingress noise are simultaneously compensated for in the CATV return channel during a data transmission interval from the transmitter means to the headend means.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 1:
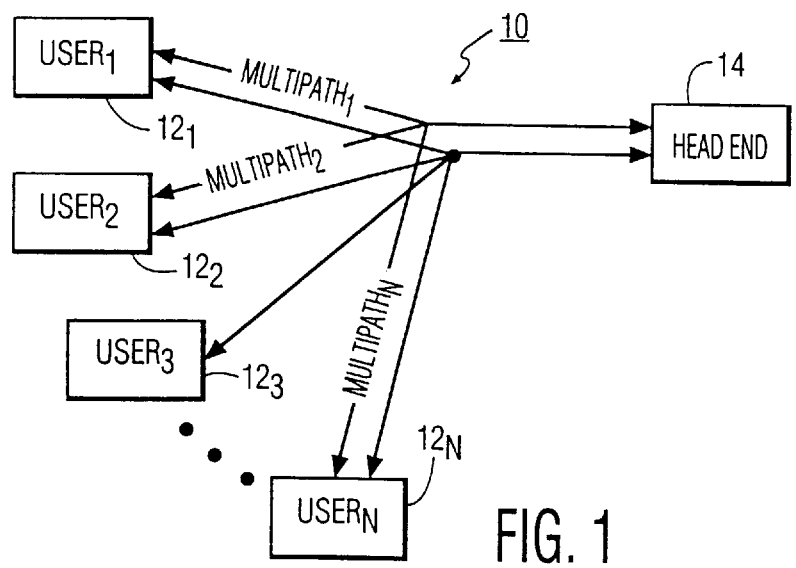
FIG. 1 shows an example of a known CATV network.
Figure 2:
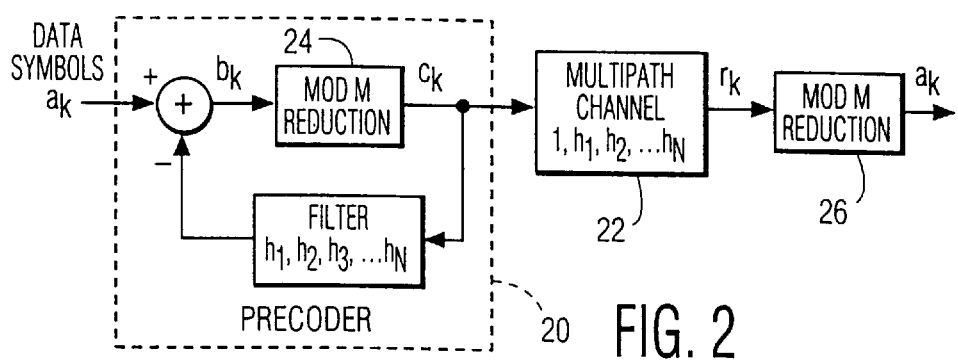
FIG. 2 illustrates a Tomlinson Harashima precoding for a causal multipath channel.

The description of the present invention shall first begin with a description of a precoder-filter combination for interference cancellation. One example of precoding known in the art is Tomlinson-Harashima (TH) preceding, as described in M. Tomlinson, "New Automatic Equalizer Employing Modulo Arithmetic", Electronic Letters, Vol. 7, pp. 138–139, March 1971. In accordance with the method and apparatus of the present invention, multipath is equalized at the transmitter of a user terminal in a feedback fashion in contrast to equalizing for multipath at a headend receiver. FIG. 2 shows an implementation of TH precoding with precoder 20 for a causal multipath channel 22. Equalizing at the transmitter of the user terminal has the advantage of having no error propagation at the headend receiver due to incorrectly detected symbols. Furthermore, in accordance with the method and apparatus of the present invention, the transmitter of the user terminal is provided with appropriate means for knowing what the multipath channel is in order to implement TH preceding, as will be discussed further herein below. For explanation purposes, let $a_k$ represent the data symbols to be transmitted and $[1, h_1, h_2, \ldots, h_N]$ be the causal multipath channel. Referring again to FIG. 2, we have:

$$c_k = b_k \bmod M \qquad \text{(EQ. 1)}$$

and, $$b_k = a_k - \sum_{i=1}^{N} h_i c_{k-1} \qquad \text{(EQ. 2)}$$

The Mod M Reduction block 24 of FIG. 2 performs a mod M operation in accordance with the following: (i) If $b_k$ is greater than M/2, then M is subtracted an integral number of times until the result $C_k$ is less than M/2, and (ii) If $b_k$ is less than –M/2, then M is added an integral number of times until the result $c_k$ is greater than –M/2. This nonlinearity in the Mod M Reduction operation ensures that the output of the precoder 20 is always bounded between –M/2 and M/2 and hence is always stable. M is chosen large enough to accommodate the constellation of $a_k$. The transmitted signal $C_k$ then goes through the channel $[1, h_1, h_2, \ldots, h_N]$ represented by reference numeral 22. The output of the channel, $r_k$, is then given by:

$$r_k = c_k + \sum_{i=1}^{N} h_i c_{k-i} \qquad \text{(EQ. 3)}$$

From EQ. 1, EQ. 2, and EQ. 3, we then have:

$$r_k = a_k \bmod M \qquad \text{(EQ. 4)}$$

Thus, doing a mod M operation via block 26 on $r_k$ recovers the transmitted symbol $a_k$.

Figure 3:
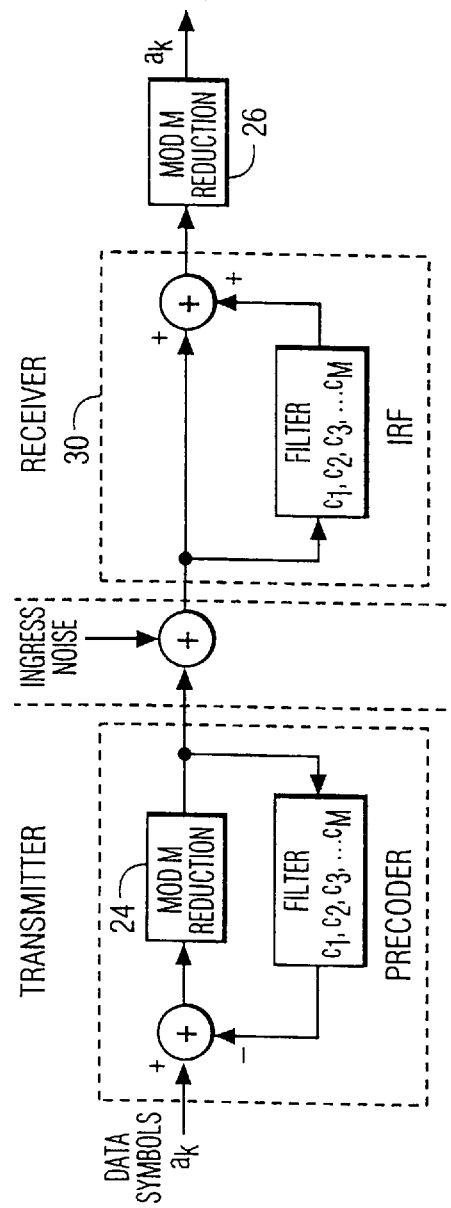
FIG. 3 illustrates Tomlinson Harashima precoding for ingress noise cancellation.

The structure as described herein above is advantageous for use in the scenario of interference cancellation. For instance, suppose that instead of multipath there was an additive interference (or ingress) for which a causal interference rejection filter (IRF) could be designed such that at the output of the filter, the interference was minimized. If this filter were to be used in the receiver alone, it would minimize the interference component while distorting the signal component. However, if the signal were to be TH precoded at the transmitter using the same coefficients as the receiver filter, the signal would emerge at the output of the receiver filter with only a mod-M factor, while the interference would be minimized. Such a structure is shown in FIG. 3, wherein the receiver filter 30 can be viewed as an intentionally introduced multipath that the signal is precoded with in order to protect the signal from the interference.

Design of the interference rejection filter (IRF) 30 is as follows. Let $[1, c_1, c_2, \ldots, c_M]$ be the coefficients of the optimal causal filter that minimizes the ingress at its output. Let $i_k$ be the ingress noise at the input to the filter, $e_k$ be the output of the filter, and $\underline{c}=[c_1, c_2, \ldots, c_M]^T$ be the vector of coefficients that need to be determined. Then, $$e_k = i_k + \sum_{i=1}^{M} c_n i_{k-n} \quad (EQ. 5)$$

Now, minimizing $E[|e_k|^2]$ with respect to the vector c gives the following expression for the optimal coefficients:

$$\underline{c} = -(R^n)^{-1}\underline{b} \quad (EQ. 6)$$

where R is the correlation matrix of the ingress noise defined as $R(n,m)=E[i_{k-n}i_{k-m}]$, $n,m=1, 2, \ldots, M$ and $\underline{b}$ is the vector defined as $b(n)=E[i_k i_{k-n}]$, $n=1, 2, \ldots, M$. Hence, the filter coefficients can be easily determined from the correlation characteristics of the ingress noise.

Figure 4:
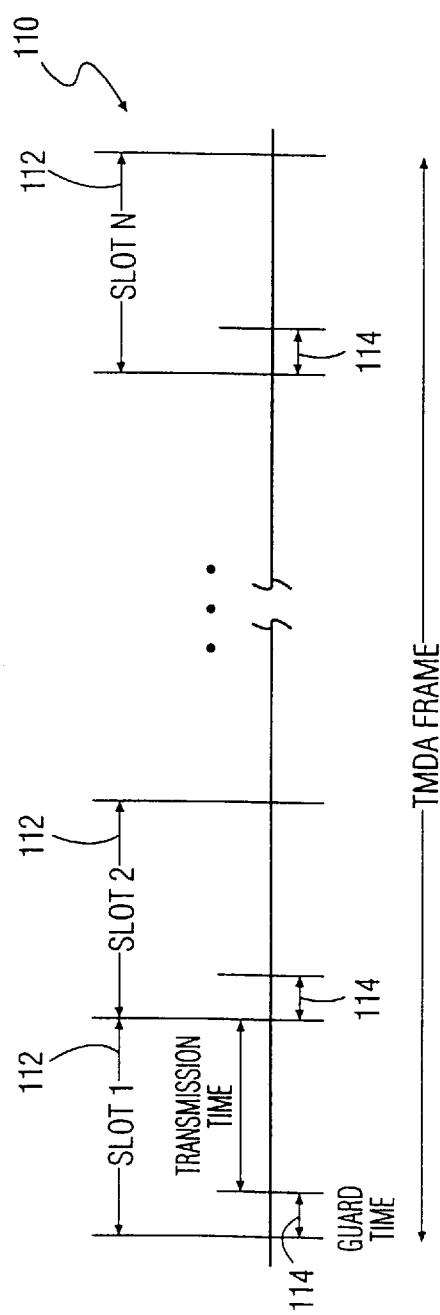
FIG. 4 shows an example of a TDMA frame having time slots for TDMA transmission with associated guard times.
Figure 5:
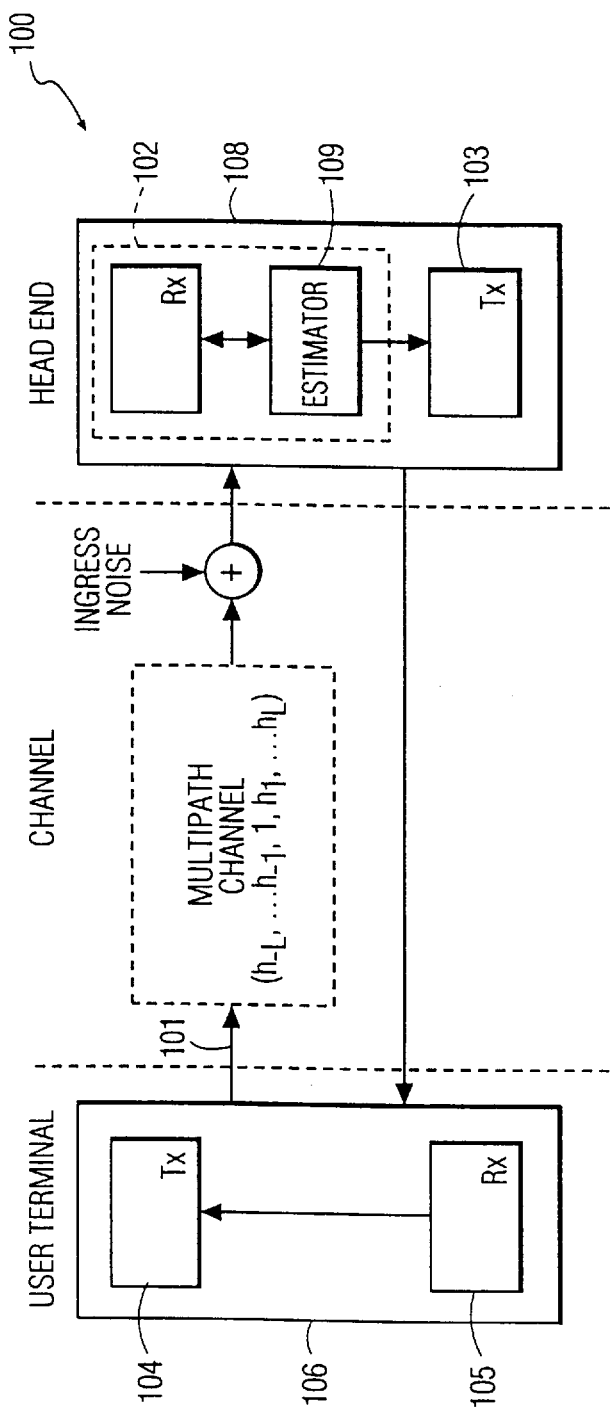
FIG. 5 illustrates a system according to the present invention for combatting ingress noise and multipath in a CATV return channel.
Figure 6:
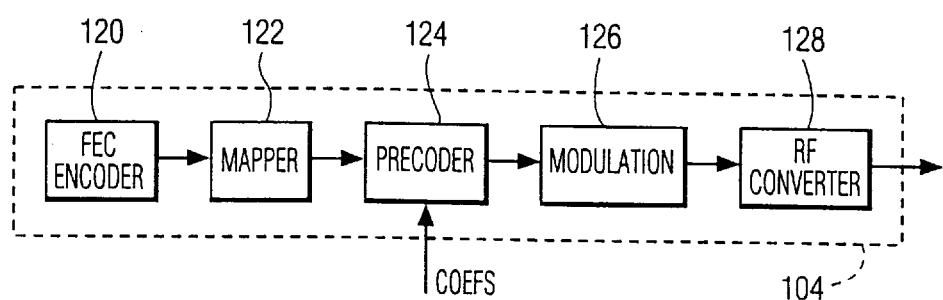
FIG. 6 shows a TDMA transmitter with a precoder in accordance with the present invention.
Figure 7:
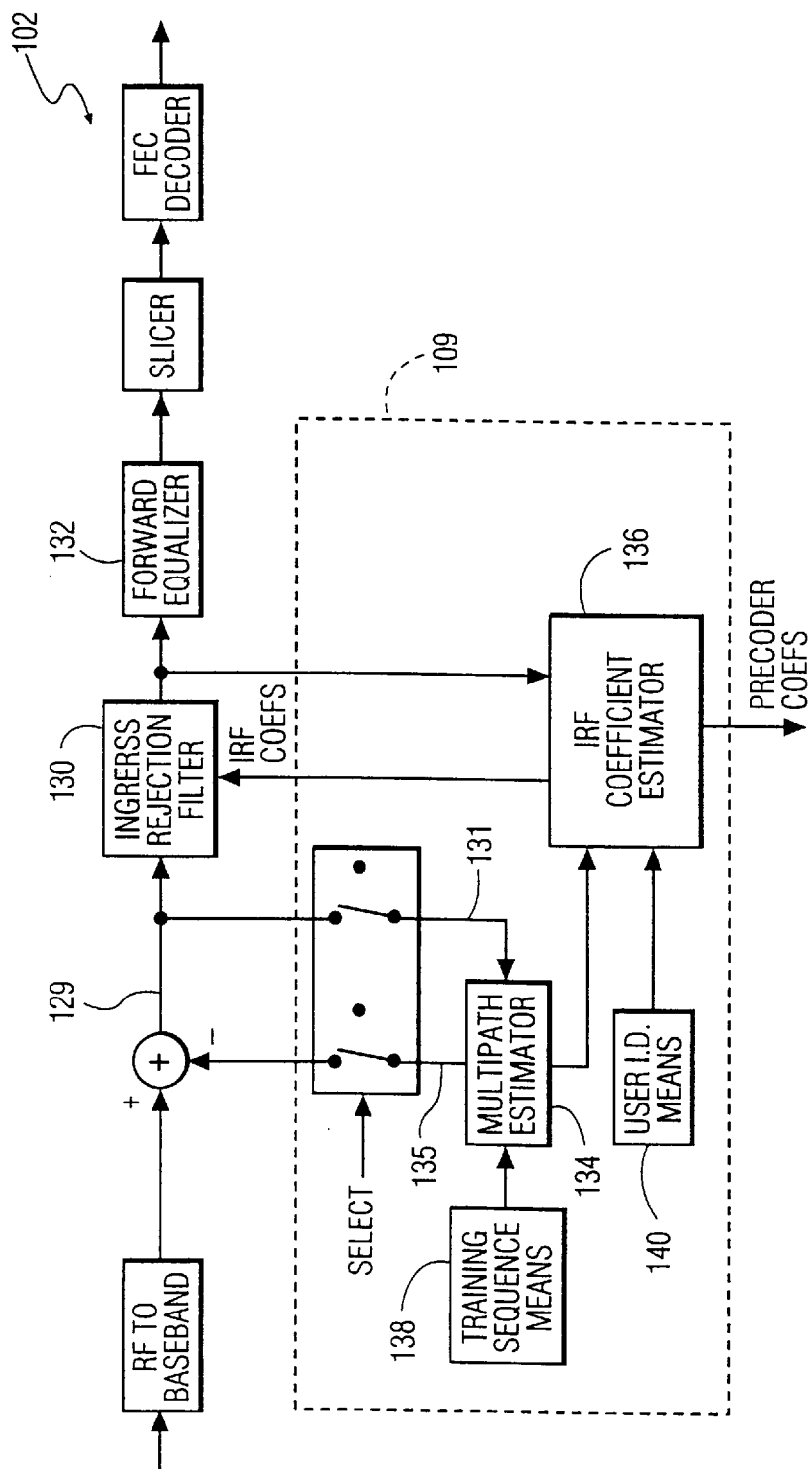
FIG. 7 shows a headend receiver having an ingress rejection filter and multipath estimator in accordance with the present invention.

Turning now to FIGS. 4–7, we will discuss a precoder-filter combination in the CATV upstream channel. The CATV upstream channel is well suited for the above-described method of interference cancellation. Let us consider a single carrier TDMA transmission scheme where each user terminal is assigned a particular time slot 112 within a TDMA frame 110 for data transmission during a prescribed data transmission interval (FIG. 4). Each user terminal 106 (only one is shown for simplicity, FIGS. 5 and 6) is equipped with a TH precoder 124, the coefficients of which are programmable but fixed. The headend receiver 102 of headend 108 includes an estimator 109 which calculates optimal causal, monic filter coefficients for minimizing the ingress noise during a training period or prescribed training interval as required for a particular CATV system (FIGS. 5 and 7). Calculation of the IRF coefficients can be accomplished easily using any well known Least Mean Squares (LMS) algorithm, or can be done also by calculating the correlation matrix for the ingress noise. The calculated coefficients are then transmitted back to each user terminal for use by the corresponding precoder to precode the data prior to transmission during a prescribed data transmission interval. The prescribed data transmission interval for a particular user terminal is in accordance with a particular set-up of the CATV system, for example, as established by a CATV system administrator. Training occurs during a training interval for each user terminal, for example, as needed for the particular CATV system or according to a schedule as established by a CATV system administrator. In the case of no multipath, each user terminal will have identical precoder filter coefficients. Since each user terminal is operating in a burst mode, at the beginning of each burst, the precoder state is required to be reset to zero, such as, during a guard time interval 114 of a respective time slot 112, i.e., during a data transmission interval and also during a training interval.

Figure 8:
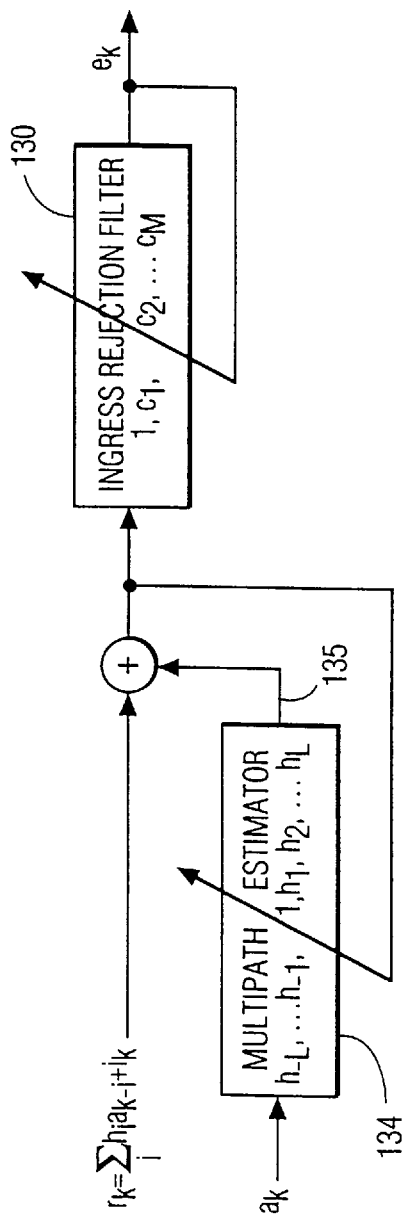
FIG. 8 illustrates diagrammatically the configuration of a multipath estimator and ingress rejection filter for use in a headend receiver during training in accordance with the present invention.
Figure 9:
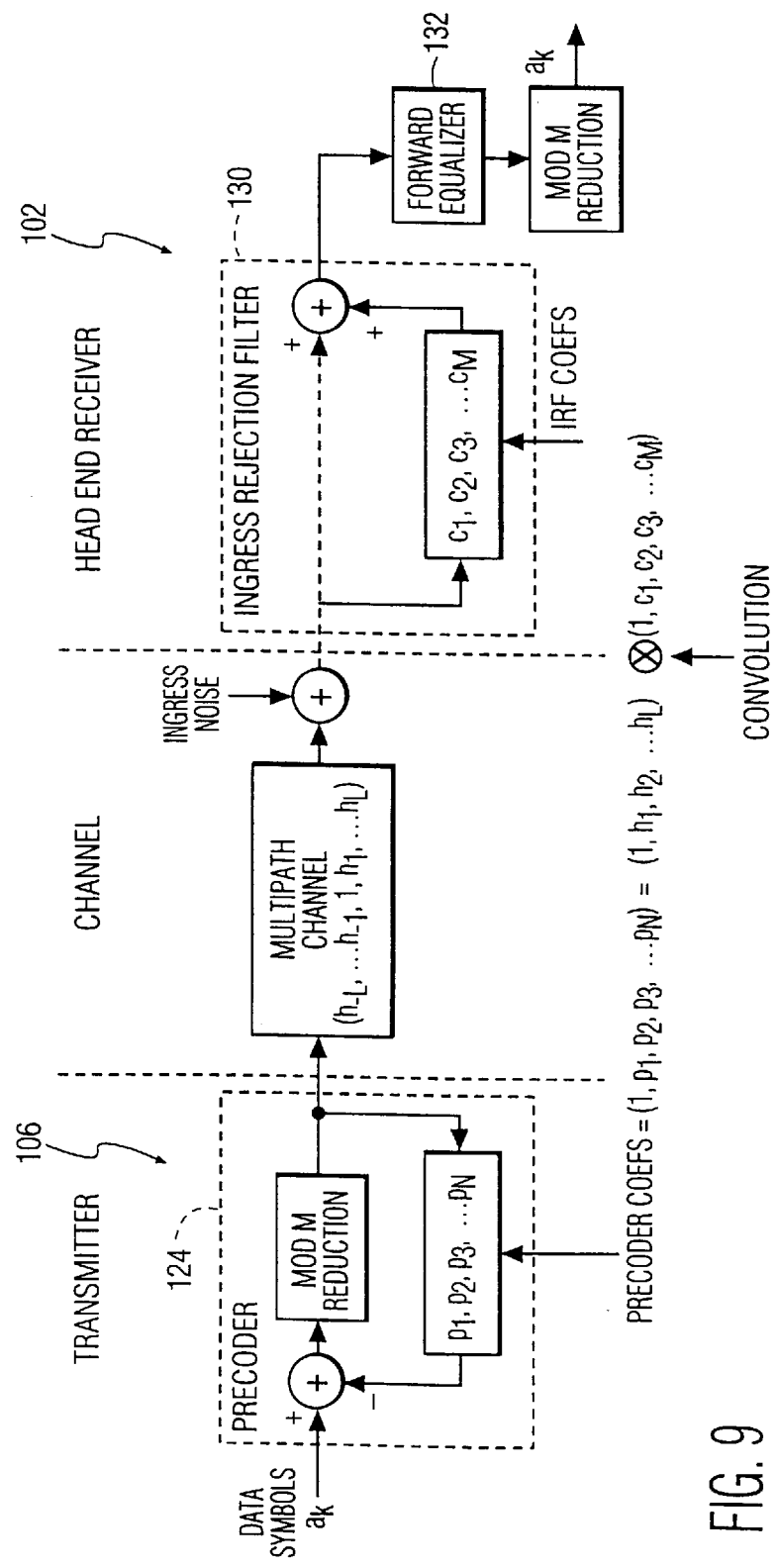
FIG. 9 illustrates the transmitter and headend receiver according to the present invention for combatting ingress noise and multipath in a CATV return channel, showing the precoder and ingress rejection filter in further detail.

In the case of Quadrature Phase Shift Keying (QPSK), the effect of multipath due to microreflections is negligible. However, with the use of 16QAM (Quadrature Amplitude Modulation), equalization as herein described advantageously combats the effects of multipath. The precoding approach is suitably modified in order to account for the multipath, as demonstrated with reference to FIG. 8. The headend receiver 102 includes a multipath estimator which estimates the multipath by minimizing the means-squared error (MSE) at its output during the training period, i.e., during the prescribed training interval for a particular user terminal of a CATV system. Upon minimization of the MSE, the output of the multipath estimator will then comprise just the ingress noise which is input to the ingress rejection filter (IRF). The means-squared error at the output of the IRF is also minimized in order to evaluate the optimum coefficients for ingress rejection. Both of these minimizations are each carried out during the training interval by use of any suitable LMS algorithm known in the art. The precoder coefficients $(1, p_1, p_2, \ldots, p_N)$ are then calculated by convolving the post-echoes of the multipath $(1, h_1, h_2, \ldots, h_L)$ with the IRF coefficients $(1, c_1, c_2, \ldots, c_M)$ as shown in FIG. 9. As a result, the precoder in the user terminal having been appropriately programmed with the respective calculated precoder coefficients will precode the transmitted signal transmitted therefrom against both post-echoes and ingress noise during a data transmission interval. The multipath pre-echoes $(h_{-L}, \ldots, h_{-2}, h_{-1})$, if any exist, can be suitably cancelled by a very small forward equalizer in the headend receiver.

Referring again to FIG. 5, in accordance with the present invention, a system 100 for cancelling both ingress noise and multipath in a CATV return channel 101 includes, in part, the use of an ingress rejection filter (hereinafter, "IRF") in a headend receiver 102. In addition, each of the TDMA transmitters 104 of user terminals 106 (only one is shown for simplicity) of the CATV system 100 is provided with a precoder, wherein each respective precoder precodes against ingress and a corresponding part of the multipath composed of post-echoes. The headend receiver 102 utilizes the IRF to cancel the ingress characteristic. In addition, a multipath estimator in the headend receiver 102 is used to estimate the multipath characteristic for each multipath in the CATV return channel during a training interval. To ensure that such a scenario is successful, a prescribed strategy, as further discussed herein, is used. In addition, during a data transmission interval, estimator 109 (i.e., multipath estimator 134 and IRF coefficient estimator 136) is rendered non-operative. See FIGS. 5 and 7. For instance, multipath estimator 134 is disconnected from signal line 129 via a controllable switching arrangement 131 during a data transmission interval and connected with signal line 129 during a training interval. A select input on switching arrangement 131 is used for controlling the state of the switching arrangement.

Turning once again to FIG. 4, a TDMA frame structure 110 is shown. Note that while the present invention is described with respect to the use of TDMA, it should be understood that other protocols and schemes for data transmission may be used. With respect to each TDMA frame 110, each user terminal 106 is assigned a specific time slot 112 within which to transmit training sequence information during a training interval or for transmitting data during a data transmission interval. Within each time slot 112, there is a guard interval 114 which allows for a transmitter to ramp up. In accordance with the present invention, during a training interval for a particular TDMA transmitter, the precoder coefficients of the TDMA transmitter are reset to zero during the guard interval at the beginning of a respective time slot. A suitable multiplexing arrangement can be implemented for selectively multiplexing the precoder coefficients between the calculated coefficient values and an initial value (i.e., zero). Furthermore, during a data transmission interval, the precoder is set to a zero state during the guard interval at a beginning of a corresponding time slot (e.g., via a "zero state" reset of the precoder filter) so that the data transmission begins from a known state..

With reference now to FIGS. 5 and 6, the TDMA transmitter 104 of user terminal 106 shall be discussed in further detail. Each user terminal 106 includes a transmitter 104 composed of a Forward Error Correction (FEC) encoder 120, followed by and connected to a QPSK (or QAM) mapper 122. An output of mapper 122 is connected to an input of precoder 124. Precoder 124 preferably comprises a Tomlinson-Harashima precoder. As previously discussed, the coefficients of precoder 124 are computed at the headend receiver 102 and then transmitted back to the user terminal 106 via transmitter 103 of headend 108 to receiver 105 of user terminal 106. The precoder coefficients are designed to cancel both multipath (post-echoes only) and ingress noise. In a most general case, each user terminal would have a different set of coefficients, since each user terminal would have a different multipath characteristic.

FIGS. 7 and 9 show the headend receiver 102 including IRF 130. In general, the IRF's for each user could be different. The forward equalizer 132 cancels pre-echoes in the multipath channel that cannot be corrected by the precoder 124. FIG. 8 shows the configuration of the multipath estimator 134 and IRF 130 in the headend receiver 102 during training. The multipath estimator 134 estimates both pre and post echoes corresponding to $(h_{-L}, \ldots, h_{-2}, h_{-1})$ and $(1, h_1, h_2, \ldots, h_L)$, respectively, in the channel using the training sequence for each transmitter. The output 135 of the multipath estimator is then subtracted from the received signal $r_k$ and the result is input to the IRF 130. The IRF coefficient estimator 136 calculates the optimum coefficients for reducing the ingress noise by minimizing the signal at the output of the IRF 130. At the end of processing of a training sequence from a respective user terminal during a training interval, the headend receiver 102 has a set of multipath coefficients and IRF coefficients for each respective user. FIG. 9 illustrates how these multipath and IRF coefficients are used to calculate the precoder coefficients, the latter of which are sent back to each respective user. Note that the precoder can cancel only post-echoes and hence only those post-echo coefficients of the multipath are used to calculate the precoder coefficients. The pre-echoes of the multipath are cancelled by the forward equalizer 132 in the headend receiver 102.

In operation, when the CATV system powers up (or resets), all the TDMA transmitters of the user terminals are appropriately instructed to send a special training sequence to the headend receiver. The headend receiver uses an adaptive channel estimator (multipath estimator) to estimate the post-echoes using the known training sequence supplied by a training sequence means 138 as well as the coefficients of the IRF. The convolution of these two sets of coefficients are then transmitted back to each of the TDMA transmitters for use by the respective precoder. The TDMA transmitters use these coefficients to initialize the precoder of each respective precoder for use thereby to precode data against multipath and ingress noise during a data transmission interval.

During an actual TDMA data transmission interval, a constraint on the precoder 124 corresponding to that transmitter 106 must be imposed. That is, the precoder 124 for each transmitter 106 must always start from the zero state, wherein precoder filter registers are set to zero before the beginning of the TDMA data transmission of the data transmission interval. The headend receiver 102, in preparation and in conjunction with the transmitter 106 during a data transmission interval, operates as follows: As soon as a transmission from a previous TDMA transmitter ends, the headend receiver promptly changes the filter coefficients of the IRF to correspond to a present TDMA transmitter, for example, as per an appropriate instruction from a user terminal identification means 140. Since a "guard" time 114 typically follows the end of each TDMA transmitter time slot 112, during which no data is sent, the headend receiver 102 is suitably programmed to acquire an appropriate zero state required for operation with the TDMA transmitter precoder having a zero data state. Upon achieving the zero state, the headend receiver 102 then looks for a synchronizing signal that will allow the headend receiver 102 to detect a beginning of a TDMA time slot 112 corresponding to the current TDMA transmitter 106. Upon a detection of the synchronizing signal, the headend receiver 106 then proceeds to receive all data being transmitted by the present TDMA transmitter until the respective TDMA time slot 112 ends (i.e., for the remainder of duration of the data transmission interval).

The novelty of the method and apparatus of the present invention lies in the fact that an IRF implemented at the headend receiver and a precoder implemented at a transmitter simultaneously compensate for both ingress noise as well as microreflections present for the particular TDMA transmitter. In other words, ingress noise and unwanted multipath characteristics are simultaneously cancelled out of the CATV return channel.

SIMULATION RESULTS

Figure 10:
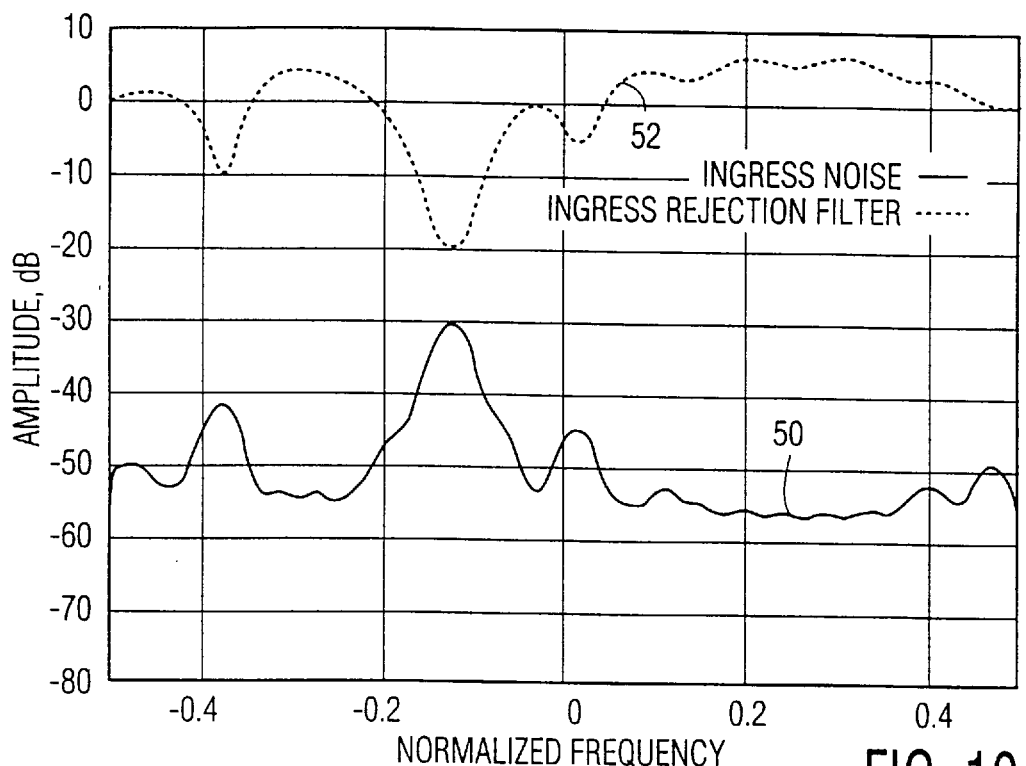
FIG. 10 illustrates a frequency response of ingress noise without filtering and filtering with the ingress rejection filter for the 99 percentile profile from 7.5 MHz to 12.5 MHz.
Figure 11:
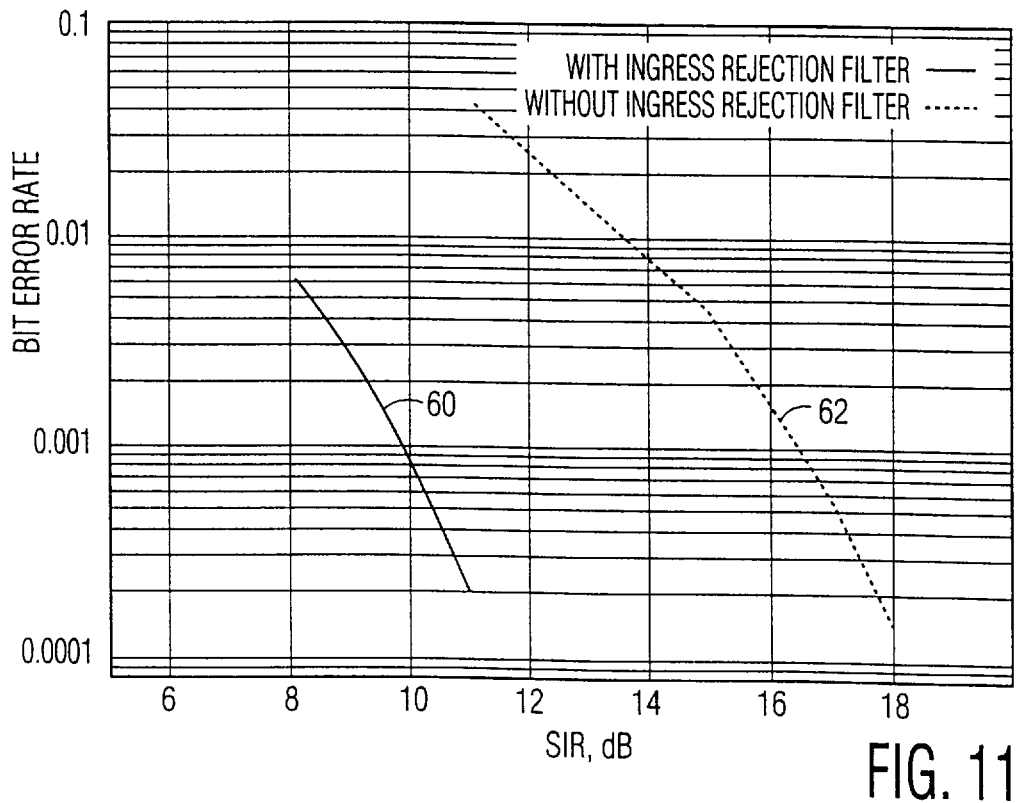
FIG. 11 illustrates the signal-to-ingress-ratio performance of a 16QAM with and without an ingress rejection filter for the ingress noise spectrum of FIG. 10.
Figure 12:
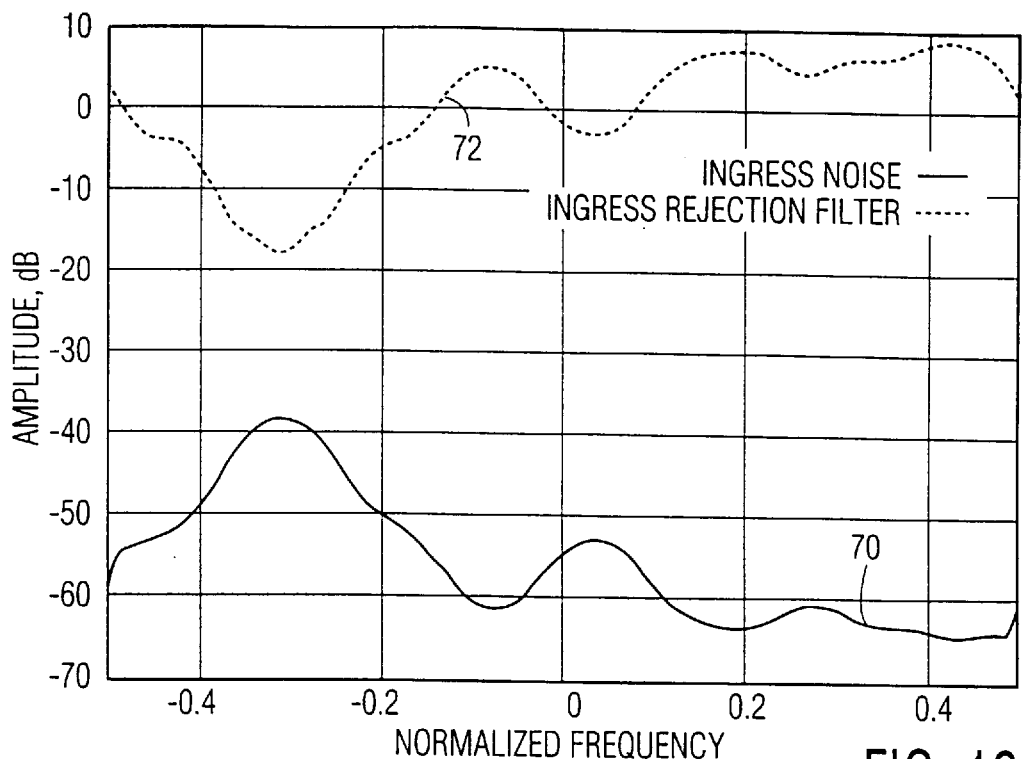
FIG. 12 illustrates a frequency response of ingress noise without filtering and filtering with the ingress rejection filter for the 99 percentile profile from 9 MHz to 11 MHz.
Figure 13:
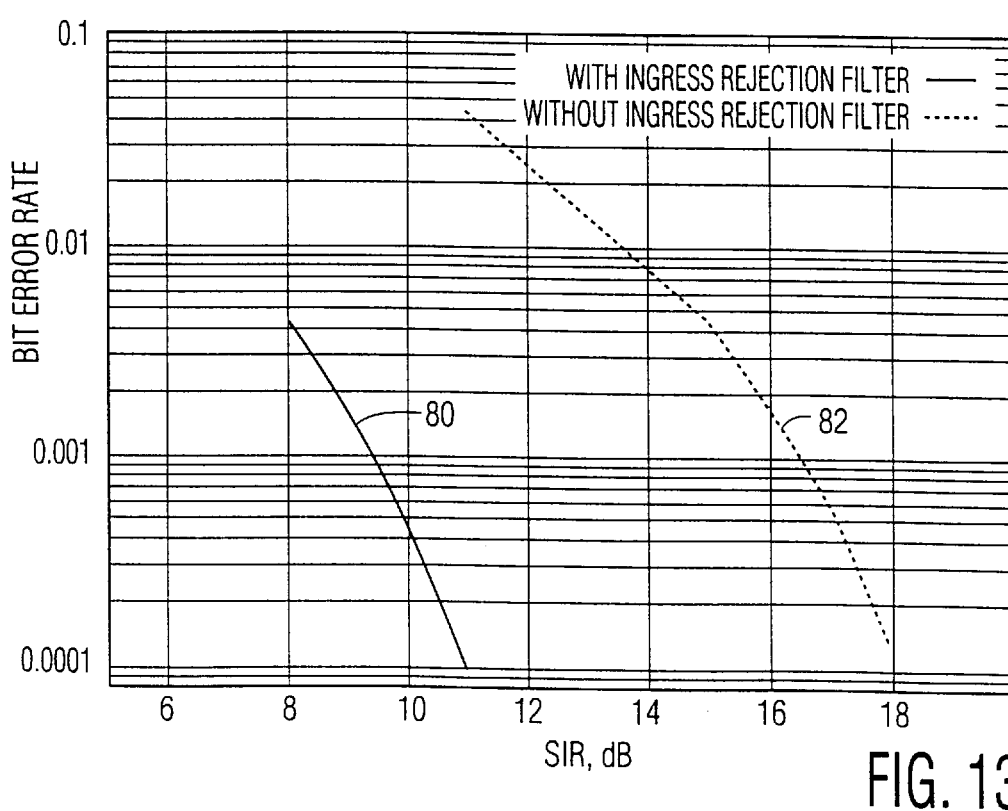
FIG. 13 illustrates the signal-to-ingress-ratio performance of a 16QAM with and without an ingress rejection filter for the ingress noise spectrum of FIG. 12.

Simulations were carried out using a 99 percentile ingress noise profile, the latter being known, for example, from B. Currivan, "CATV Upstream Channel Model, Rev. 1.0", IEEE 802.14 contribution, IEEE 802.14/95-133, Nov. 15, 1995. FIG. 10 shows a 5 MHz section of this profile from 7.5 MHz to 12.5 MHz. As can be observed from FIG. 10, a number of very strong interferers are in this band. It can also be seen from FIG. 10 that usage of an ingress-avoidance approach would lead to very poor bandwidth utilization. However, in accordance with the present invention, a 10-tap ingress rejection filter was found to cancel the interferers extremely well and further provides an almost 7dB performance improvement over the entire band, as shown in FIG. 10. The solid line 50 and dashed line 52 of FIG. 10 represent the frequency response for ingress noise without filtering and ingress using the ingress rejection filter, respectively. FIG. 11 shows the signal-to-ingress-ratio (SIR) vs. bit error rate (BER) plot for 16QAM using a 10-tap precoder at the transmitter and the IRF at the receiver, showing a 7dB improvement. In FIG. 11, solid line 60 represents that SIR resulting with use of the IRF and dashed line 62 represents that SIR without the IRF. Similar improvements can be seen using narrower bands like 2 MHz as shown in FIGS. 12 and 13, where the band from 9 MHZ to 11 MHZ has been used. The solid line 70 and dashed line 72 of FIG. 12 represent the frequency response for ingress noise without filtering and ingress using the ingress rejection filter, respectively. In FIG. 13, solid line 80 represents that SIR resulting with use of the IRF and dashed line 82 represents that SIR without the IRF. As has been demonstrated via these results, it can be seen that with the method and apparatus of the present invention, the more severe the ingress noise, the more will be the dB gain obtained.

The present invention thus advantageously provides a method and apparatus for multipath and ingress rejection as discussed with respect to single carrier TDMA systems (QPSK or QAM). The method and apparatus of the present invention can be used to cancel ingress noise over wide and narrow bandwidths and hence advantageously improves bandwidth utilization. That is, the present invention offers superior bandwidth utilization. The simulation results demonstrate the efficacy of the method and apparatus of the present invention. In addition, added complexity to the CATV system resulting from the method and apparatus of the present invention is minimal. For instance, 10-tap filters were found to provide very good cancellation of severe ingress noise.

Thus there has been shown a method and system which utilizes a precoder having programmable but fixed coefficients at respective TDMA transmitters of the system and an IRF having programmable but fixed coefficients at a headend receiver of the system. The coefficients for both the precoders and the IRF are determined by periodically sending a training sequence from each respective TDMA transmitter to the headend receiver during a training interval. Additionally, each precoder of the TDMA transmitters is made to start with a zero state at the beginning of each data transmission during a data transmission interval. As a result, the method and apparatus of the present invention simultaneously compensate for both ingress noise as well as microreflections present for each TDMA transmitter, wherein ingress noise and unwanted multipath characteristics are simultaneously cancelled out of the CATV return channel.

While the invention has been particularly shown and described with reference to the preferred embodiment thereof, it will be understood by those skilled in the art that various changes in form and detail may be made therein without departing from the spirit and scope of the invention.

What is claimed is:

1. A method for combatting ingress noise and multipath in a CATV return channel between a terminal unit having a transmitter and a headend having a receiver, said method comprising the steps of:

a) providing the transmitter with a precoder having programmable coefficients;

b) providing the receiver with an ingress rejection filter (IRF) having programmable coefficients;

c) sending a non-precoded training sequence from the transmitter to the receiver during a training interval;

d) estimating the multipath and the ingress at the receiver based upon the training sequence sent by the transmitter and received by the receiver and calculating the precoder coefficients and the IRF coefficients; and f) programming the precoder and the ingress rejection filter with the calculated precoder coefficients and IRF coefficients, respectively, for use by the precoder and the ingress rejection filter during a data transmission interval, wherein undesirable effects of multipath and ingress noise are simultaneously compensated for in the CATV return channel during data transmission from the transmitter to the headend.

2. The method of claim 1, wherein during the training interval, sending the non-precoded training sequence from the transmitter to the receiver comprises initializing the precoder coefficients to zero, initializing the precoder with a zero state, and then transmitting the training sequence.

3. The method of claim 2, said method further comprising the step of initializing the precoder and the ingress rejection filter with a zero state at a beginning of a data transmission interval.

4. A system for combatting ingress noise and multipath in a CATV return channel, said system comprising:

transmitter means for transmitting digital data along the CATV return channel having a multipath characteristic and ingress noise, said transmitter means including a precoder for precoding the digital data to be transmitted, the precoder having programmable coefficients; and headend means for receiving the transmitted digital data of said transmitter means, said headend means including an ingress rejection filter (IRF) having programmable coefficients, and estimator means for estimating during a training interval the multipath and the ingress noise at said headend based upon a non-precoded training sequence sent by said transmitter means and received by said headend means, the estimator means including means for calculating the coefficients for use in the precoder and the ingress rejection filter, respectively, upon a reception of the training sequence, the estimator means further providing output signals for programming the precoder and the ingress rejection filter, respectively, with the calculated coefficients, wherein undesirable effects of multipath and ingress noise are simultaneously compensated for in the CATV return channel during a data transmission interval from said transmitter means to said headend means.

5. The system for combatting ingress noise and multipath in a CATV return channel of claim 4, wherein said transmitter means further comprises means for setting the precoder coefficients to zero during the training interval for enabling said transmitter means to transmit the training sequence without precoding.

6. The system for combatting ingress and multipath in a CATV return channel of claim 5, further wherein said transmitter means further comprises means for initializing the precoder to a zero state at a beginning of each data transmission interval, and said headend means further comprises means for initializing the IRF to a zero state at the beginning of each data transmission interval.

7. The system for combatting ingress noise and multipath in a CATV return channel of claim 4, wherein the estimator means includes (i) a multipath estimator for estimating multipath coefficients by minimizing a first error signal formed by a difference between the received signal and a convolution of the training sequence with an estimated multipath to obtain the multipath coefficients, the multipath estimator outputting the estimated multipath coefficients, and (ii) an IRF coefficient estimator responsive to the first error signal for estimating IRF coefficients by minimizing an output of the IRF, the IRF coefficient estimator outputting the IRF coefficients to the IRF for programming of the IRF with the IRF coefficients and further outputting precoder coefficients corresponding to a convolution of the multipath coefficients and IRF coefficients to said transmitter means for programming of the precoder with the precoder coefficients.

8. The system for combatting ingress noise and multipath in a CATV return channel of claim 4, further comprising a plurality of transmitter means each for transmitting, during an assigned data transmission time slot, digital data along the CATV return channel having a respective multipath characteristic and ingress noise, and wherein said headend means further comprises means for storing a plurality of calculated IRF coefficients corresponding to respective ones of the plurality of transmitter means and for updating the IRF with corresponding IRF coefficients in preparation for a reception of data from a respective transmitter means.

9. The system for combatting ingress noise and multipath in a CATV return channel of claim 5, further comprising a plurality of transmitter means each for transmitting, during an assigned data transmission time slot, digital data along the CATV return channel having a respective multipath characteristic and ingress noise, and wherein said headend means further comprises means for storing a plurality of calculated IRF coefficients corresponding to respective ones of the plurality of transmitter means and for updating the IRF with corresponding IRF coefficients in preparation for a reception of data from a respective transmitter means.

10. The system for combatting ingress noise and multipath in a CATV return channel of claim 6, further comprising a plurality of transmitter means each for transmitting, during an assigned data transmission time slot, digital data along the CATV return channel having a respective multipath characteristic and ingress noise, and wherein said headend means further comprises means for storing a plurality of calculated IRF coefficients corresponding to respective ones of the plurality of transmitter means and for updating the IRF with corresponding IRF coefficients in preparation for a reception of data from a respective transmitter means.

11. The system for combatting ingress noise and multipath in a CATV return channel of claim 7, further comprising a plurality of transmitter means each for transmitting, during an assigned data transmission time slot, digital data along the CATV return channel having a respective multipath characteristic and ingress noise, and wherein said headend means further comprises means for storing a plurality of calculated IRF coefficients corresponding to respective ones of the plurality of transmitter means and for updating the IRF with corresponding IRF coefficients in preparation for a reception of data from a respective transmitter means.

12. A system for combatting ingress noise and multipath in a CATV return channel, said system comprising:

transmitter means for transmitting digital data along the CATV return channel having a multipath characteristic and ingress noise, said transmitter means including a precoder for precoding the digital data to be transmitted, the precoder having programmable coefficients, said transmitter means further including means for setting the precoder coefficients to zero during the training interval for enabling said transmitter means to transmit the training sequence without precoding and means for initializing the precoder to a zero state at a beginning of each data transmission interval; and headend means for receiving the transmitted digital data of said transmitter means, said headend means including an ingress rejection filter (IRF) having programmable coefficients, estimator means for estimating during a training interval the multipath and the ingress noise at said headend based upon a non-precoded training sequence sent by said transmitter means and received by said headend means, the estimator means further calculating the coefficients for use in the precoder and the ingress rejection filter, respectively, upon a reception of the training sequence, the estimator means further providing output signals for programming the precoder and the ingress rejection filter, respectively, with the calculated coefficients, wherein the estimator means includes (i) a multipath estimator for estimating multipath coefficients by minimizing a first error signal formed by a difference between the received signal and a convolution of the training sequence with an estimated multipath to obtain the multipath coefficients, the multipath estimator outputting the estimated multipath coefficients, and (ii) an IRF coefficient estimator responsive to the first error signal for estimating IRF coefficients by minimizing an output of the IRF, the IRF coefficient estimator outputting the IRF coefficients to the IRF for programming of the IRF with the IRF coefficients and further outputting precoder coefficients corresponding to a convolution of the multipath coefficients and IRF coefficients to said transmitter means for programming of the precoder with the precoder coefficients, and means for initializing the IRF to a zero state at the beginning of each data transmission interval, wherein undesirable effects of multipath and ingress noise are simultaneously compensated for in the CATV return channel during a data transmission interval from said transmitter means to said headend means.

13. The system for combatting ingress noise and multipath in a CATV return channel of claim 12, further comprising a plurality of transmitter means each for transmitting, during an assigned data transmission time slot, digital data along the CATV return channel having a respective multipath characteristic and ingress noise, and wherein said headend means further comprises means for storing a plurality of calculated IRF coefficients corresponding to respective ones of the plurality of transmitter means and for updating the IRF with corresponding IRF coefficients in preparation for a reception of data from a respective transmitter means.

* * * * *